United States Patent

Broman

[11] Patent Number: 4,476,964
[45] Date of Patent: Oct. 16, 1984

[54] SEAT-BRAKE INCLUDING LOCKOUT
[75] Inventor: Donald E. Broman, Lincoln, Nebr.
[73] Assignee: Outboard Marine Corporation, Waukegan, Ill.
[21] Appl. No.: 357,054
[22] Filed: Mar. 11, 1982
[51] Int. Cl.³ .................. F16D 65/14; F16D 55/16
[52] U.S. Cl. .................. 188/109; 74/106; 74/526; 180/273; 188/72.9
[58] Field of Search .............. 188/109, 106 R, 72.8, 188/72.9; 180/273; 74/106, 520, 526; 297/217; 303/18–19

[56] References Cited

U.S. PATENT DOCUMENTS

| 699,583 | 5/1902 | Sherk | 297/217 |
|---|---|---|---|
| 1,496,357 | 6/1924 | Page | 74/526 |
| 1,553,025 | 9/1925 | Brinkmann | 74/526 |
| 1,708,009 | 4/1929 | Burger et al. | 188/109 |
| 1,844,818 | 2/1932 | Gattie | 188/109 |
| 2,672,203 | 3/1954 | Brown | 188/109 |
| 2,750,010 | 6/1956 | Day | 188/109 |
| 2,918,145 | 12/1959 | White | 188/109 |
| 3,211,250 | 10/1965 | Wood | 188/273 |
| 3,259,203 | 7/1966 | Ryskamp | 188/109 |
| 3,332,522 | 7/1967 | Dence | 188/109 |
| 3,664,453 | 5/1972 | Cottrell et al. | 188/109 |
| 3,664,454 | 5/1972 | Cottrell | 188/109 |
| 3,700,062 | 10/1972 | Garnett | 188/273 |
| 3,708,041 | 1/1973 | Hahn | 188/72.9 |
| 3,749,207 | 7/1973 | Meyer et al. | 188/109 |
| 3,892,294 | 7/1975 | Nieminski | 188/109 |
| 4,116,296 | 9/1978 | Pleier et al. | 188/109 |

FOREIGN PATENT DOCUMENTS 883624  10/1971  Canada .......................... 188/72.9

Primary Examiner—Douglas C. Butler
Assistant Examiner—Robert J. Oberleitner
Attorney, Agent, or Firm—Michael, Best & Friedrich

[57] ABSTRACT

A seat brake is provided for use in a vehicle having a seat movable between a lower position when weight is placed on the seat and an upper position when weight is removed from the seat, and having a brake selectively engageable to brake the vehicle. The seat brake causes the brake to be engaged when the seat moves to the upper position and causes the brake to be disengaged when the seat moves to the lower position. The seat brake also includes a lockout assembly for selectively causing the brake to be locked in disengagement.

7 Claims, 4 Drawing Figures

U.S. Patent  Oct. 16, 1984  4,476,964
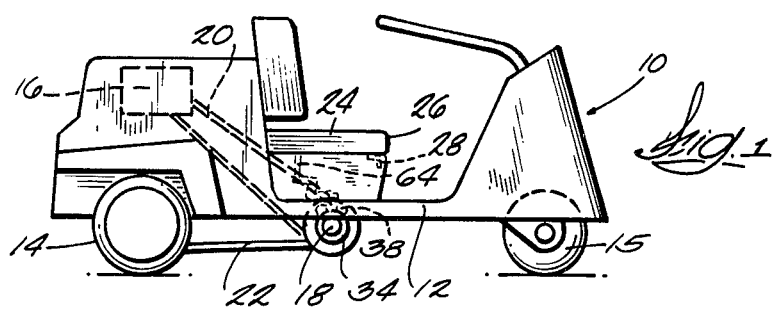
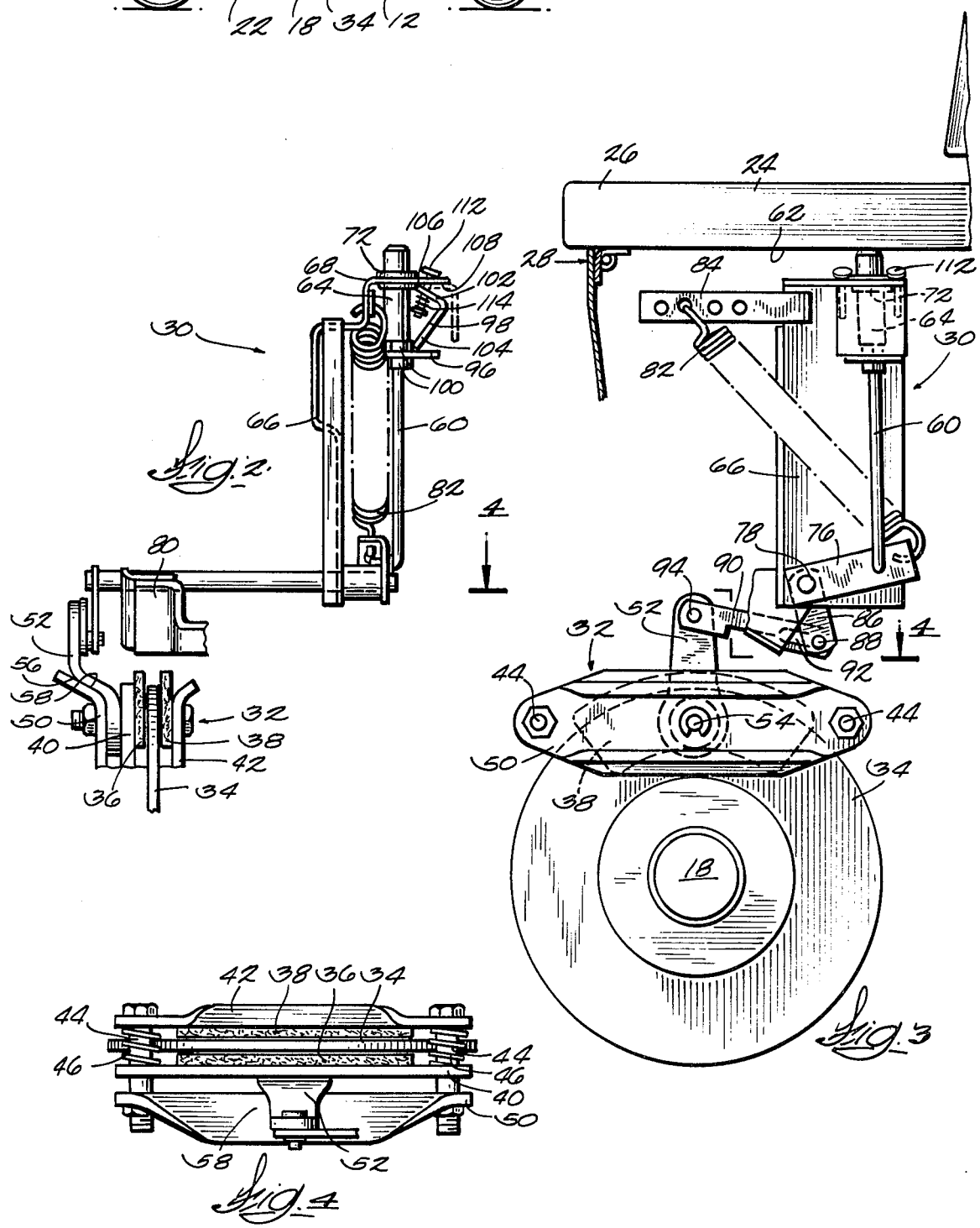

SEAT-BRAKE INCLUDING LOCKOUT

FIELD OF THE INVENTION

The invention relates to brake mechanisms and more particularly to automatic seat brakes adapted to cause a vehicle to be braked when an operator leaves the driver's seat.

BACKGROUND PRIOR ART

Examples of prior art seat brakes are shown in the Cottrell et al. U.S. Pat. No. 3,664,453, issued May 23, 1972; the Cottrell U.S. Pat. No. 3,664,454, issued May 23, 1972; the Meyer et al. U.S. Pat. No. 3,749,207, issued July 31, 1973; the Dence U.S. Pat. No. 3,332,522, issued July 25, 1967; the Ryskamp U.S. Pat. No. 3,259,203, issued July 5, 1966; the Brown U.S. Pat. No. 2,672,203, issued Mar. 16, 1954; and the Wood U.S. Pat. No. 3,211,250 issued Oct. 12, 1965.

Attention is also directed to the Gattie U.S. Pat. No. 1,844,818, issued Feb. 9, 1932; the Burner et al. U.S. Pat. No. 1,708,009, issued Apr, 9, 1929, the Day U.S. Pat. No. 2,750,010, issued June 12, 1956; the Pleier et al. U.S. Pat. No. 4,116,296, issued Sept. 26, 1978; and the Nieminski U.S. Pat. No. 3,892,294, issued July 1, 1975.

Attention is further directed to the White U.S. Pat. No. 2,918,145, issued Dec. 22, 1959; and the Garnett U.S. Pat. No. 3,700,062, issued Oct. 24, 1972.

SUMMARY OF THE INVENTION

The invention includes a seat brake for use in a vehicle having a frame and a seat, at least a portion of the seat being movable with respect to the frame between a lower position when weight is placed on the seat and an upper position when weight is removed from the seat, and the vehicle also having a brake selectively engageable to brake the vehicle. The seat brake includes means for causing the brake to be engaged when the portion of the seat moves to the upper position and means for causing the brake to be disengaged when the portion of the seat moves to the lower position. Means are further provided for selectively locking the brake in disengagement.

In a preferred embodiment of the invention the means for causing the brake to be engaged includes a vertically shiftable member having an upper end engageable with the seat and a lower end, and means for connecting the lower end of the vertically shiftable member to the brake, and for causing the brake to be engaged when the vertically shiftable member moves upwardly and for causing disengagement of the brake when the vertically shiftable member moves downwardly.

In one embodiment of the invention the means for connecting the lower end of the vertically shiftable member to the brake includes a lever arm having one end supported for pivotal movement about an axis, that one end being connected to the brake and an opposite end connected to the vertically shiftable member for movement with the vertically shiftable member.

In one embodiment of the invention the vertically shiftable member comprises a vertically extending rod having an upper end engaging the seat and a lower end and further including a spring means connected to the lower end of the rod and biasing the rod upwardly against the seat.

In one embodiment of the invention the means for selectively locking includes a stop member surrounding at least a portion of the vertically shiftable member and movable with the vertically shiftable member, a locking member, and means for supporting the locking member for movement between a first position wherein the locking member engages the stop member to prevent upward movement of the stop member and the vertical member and a second position wherein the stop member is freely movable with respect to the locking member.

The invention further includes a seat brake for use in a vehicle, the seat brake having a vertical member including an upper end and a lower end, the vertical member being movable between an upper position and a lower position. The vertical member is adapted to be connected to a brake means so as to brake the vehicle when the vertical member is in the upper position and to disengage the brake when the vertical member is in the lower position. Means are also provided for selectively locking the vertical member in the brake disengaging position, the means for locking including a stop member fixed to the vertical member intermediate its opposite ends, and a locking member supported by the frame for movement between a first position and a locking position wherein the locking member engages the stop member and restrains the vertical member against upward movement. Means are also provided for biasing the vertical member toward an upper brake engaging position.

The invention also includes a vehicle having a frame, wheels for supporting the frame for movement along the ground, and a seat for supporting an operator, at least a portion of the seat being movable between an upper position and a lower position when weight is placed on the seat. The vehicle also includes an engine, and means for drivingly connecting the engine to at least one of the wheels. The means for drivingly connecting includes a drive shaft and means for braking the drive shaft when the seat is in the upper position, the means for braking including a vertical member supported for vertical movement with the seat between an upper position when the seat is in the upper position and a lower position when the seat is in the lower position, a brake disc fixed to the drive shaft for rotation with the drive shaft, and means for selectively frictionally engaging the brake disc to restrain the brake disc against rotation. Means connected to the vertical member are also provided for forcing the friction member into frictional engagement with the brake disc when the vertical member is in the upper position and for releasing the friction member from frictional engagement when the vertical member moves to the lower position. Means are further provided for releasably locking the vertical member in the lower position.

In a preferred embodiment of the invention the vertical member includes a stop member fixed to the vertical member and the means for locking includes a pivotable member supported by the frame for pivotal movement between a locking position wherein the pivotable member engages the stop member to prevent upward movement of the stop member and a release position.

Various other features and advantages of the invention will become apparent by reference to the following description of a preferred embodiment, to the claims, and to the drawings.

BRIEF DESCRIPTION OF THE DRAWINGS

FIG. 1 is a side elevational view of a vehicle embodying the present invention.

FIG. 2 is an enlarged view of a portion of a seat brake embodied in the vehicle illustrated in FIG. 1.

FIG. 3 is a side elevation view of the apparatus shown in FIG. 2 and further including a vehicle seat.

FIG. 4 is a cross section view taken along line 4—4 in FIG. 3.

Before explaining the invention in detail, it is to be understood that the invention is not limited in its application to the details of construction and to the arrangement of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF A PREFERRED EMBODIMENT

Illustrated in FIG. 1 is a small vehicle 10 embodying the present invention and including a frame 12 supported by wheels 14 and 15. The vehicle 10 also includes an engine 16 drivingly connected to the rear wheels 14. While the means for drivingly connecting the engine 16 to the wheels 14 could have various constructions, in the illustrated arrangement it includes a driven shaft 18 operably connected by a flexible drive member 20 to the engine 16 and the driven shaft 18 being in turn connected to the drive wheels 14 by a second flexible drive member such as a drive belt 22. Also included in the vehicle is a seat 24 for the operator, the seat 24 being supported for pivotal movement such that a portion of the seat 24 is vertically movable. More particularly, in the illustrated construction the forward portion or edge 26 of the seat 24 is supported for pivotal movement about a generally horizontal axis by a hinge arrangement 28.

The vehicle also includes a seat brake 30 (FIGS. 2 and 3) for selectively braking the vehicle 10 when the operator removes his weight from the seat 24. The seat brake 30 includes a brake assembly mechanism 32 operable to brake rotation of the driven shaft 18 when the operator leaves the seat 24 and to permit rotation of the driven shaft 18 when the operator is sitting on the seat 24.

While the brake assembly 32 could have various constructions, in the illustrated arrangement a brake disc 34 surrounds the driven shaft 18 and is rotatable with the driven shaft. A pair of brake pads 36 and 38 are positioned on opposite sides of the brake disc 34, and means are provided for selectively moving the brake pads 36 and 38 toward one another to clampingly engage the brake disc 34. In the illustrated construction, the means for supporting the brake pads 36 and 38 includes a pair of parallel brake plates 40 and 42, respectively, the brake plates 40 and 42 being movable toward and away from each other and adapted to be supported on a pair of parallel shafts 44. Coil springs 46 surround the shafts and are positioned between the plates 40 and 42 to bias the brake plates 40 and 42 away from each other to thereby hold the brake pads 36 and 38 supported by the brake plates 40 and 42 in spaced apart relation. The brake means 32 also includes a third plate 50 supported by the shafts 44 so as to be parallel to the first and second brake plates 40 and 42.

The brake means also includes cam means for causing selective movement of the central brake plate 40 toward and away from the plate 50 and to thereby cause movement of the brake pads 36 and 38 toward and away from each other and consequent clamping engagement of the brake pads 36 and 38 with the brake disc 34. In the illustrated construction, the cam means includes a lever 52 having one end pivotably joined by a pivot pin 54 to a central portion of the plate 40 so as to be pivotable about an axis parallel to the shafts 44. The cam lever 52 includes a cam surface 56 slidably supported on a second cam surface 58 of the plate 50. The cam surfaces 56 and 58 of the cam lever 52 and the plate 50 are arranged such that when the lever 52 is in a central or upright position as shown in FIGS. 3 and 4, the brake pads 36 and 34 are spaced apart and when the cam lever 52 is pivoted to the right when viewed as from the angle of in FIG. 3, the brake pad 36 supported by the plate 40 will move toward the opposed brake pad 38 and clampingly engage the brake disc 34 therebetween.

As previously stated, the seat 24 of the vehicle is constructed such that a rear portion of the seat moves vertically when the operator moves on and off of the seat 24, the seat being pivotably joined at its forward edge to the vehicle frame 12 by the hinge mechanism 28. Means are also provided for causing movement of the lever arm 52 of the brake means 32 from the position shown in FIG. 2 to a braking position when the driver leaves the seat 24 and the rearward portion of the seat moves upwardly. The means for causing movement of the lever arm 52 of the brake includes a vertical member 60 supported for limited vertical reciprocal movement, the upper end of the vertical member resting against a lower surface 62 of a rearward portion of the seat 24 such that downward movement of the seat 24 causes downward movement of the vertical member 60. While the vertical member 60 could have other constructions, in the illustrated arrangement it comprises a vertical rod 60 having a threaded upper end supporting a rod guide 64 threaded onto the upper end. While various means could be provided for supporting the vertical member 60, in the illustrated construction a generally vertical bracket member 66 is fixed to the vehicle frame 12 and includes an upper generally horizontal bracket portion 68 including a bore, and the rod guide 64 attached to the end of the vertical rod 60 extends through that bore. The bore in the horizontal portion of the first bracket member also houses a bushing 72 including a central opening adapted to slidably house the rod guide 64 and for supporting the rod guide 64 for free slidable vertical movement. The lower end of the vertical member 60 is pivotally connected to one end of a lever arm 76. The opposite end of the lever arm 76 is fixed to a horizontal shaft 78. The horizontal shaft 78 is supported for rotation about its longitudinal axis at one end by the lower end of the generally vertical bracket member 66 fixed to the vehicle frame 12, and at its opposite end by a second bracket member 80 also fixedly attached to the vehicle frame.

Means are also provided for biasing the vertical member 60 and the vertically movable portion of the seat 24 toward the raised position. While various biasing means could be provided, in the illustrated arrangement, a coil spring 82 is connected to the free end of the lever arm 76 biasing it upwardly, and consequently biasing the vertical rod 60 upwardly. The coil spring 82 provides sufficient upward force on the vertical rod 60 to move the vertical rod 60 to its raised position and to lift the seat 24 when the operator moves his weight from the seat. The upper end of the spring 82 is fixed to a rigid arm 84 supported by the bracket 66.

The means for causing movement of the cam lever 52 in response to vertical movement of the vertical rod 60 also includes a downwardly extending lever arm 86 fixed to the horizontal shaft 78 for rotation with the shaft. The lower end of the lever arm 86 is joined by a pin 88 to link 90, the link 90 including one end having a longitudinally extending slot 92, the slot 92 housing the pin 88 carried by the lower end of the lever arm 86. The opposite end of the link 90 is pivotally joined by a pivot pin 94 to the upper end of the brake cam lever 52.

In operation, when the vehicle operator removes his weight from the seat 24, the spring 82 forces upwardly the vertical member 60 and the seat 24. The spring 82 also causes rotation of the lever arm 76 in a counterclockwise direction, as seen in FIG. 3, about the axis of the shaft 78, and the shaft 78 is also caused to rotate in a counterclockwise direction. Such rotation of the shaft 78 causes movement of the lower end of the lever arm 86 to the right, and the pin 88 supported by the lower end of the lever arm 86 engages the end of the slot 92 in the link 90 and moves to the link 90 to the right, thereby causing pivotal movement of the brake cam lever 52 from the position shown in FIG. 3 to a braking-position. As previously described, such pivotal movement of the brake cam lever 52 causes movement of the brake pads 36 and 38 toward one another to thereby brake the disc 34.

When the operator again places his weight on the seat 24, the seat 24 forces the vertical rod 60 downwardly and causes consequent rotation of the shaft 78 such that the lower end of the lever arm 86 moves to the left. The link 90 and the upper end of the brake cam lever 52 are then free to move to the left and to return to the position shown in FIG. 3. The compression springs 46 surrounding the parallel shafts 44 and positioned between the brake plates 40 and 42 force the brake pads 36 and 38 apart to release the brake disc 34.

By providing the slot 92 in the end of the link 90, alternative brake means, such as a hand brake, can be provided for causing braking movement of the cam lever 52 when the vertical shaft 60 is in its downward or brake disengaged position. More particularly, due to the provision of the slot 92 in the end of the link, additional manually operative means (not shown) can be provided for shifting the brake cam lever 52 to the right as seen in FIG. 3 to thereby provide movement of the brake pads 36 and 38 into frictional engagement with the brake disc 34.

Means are also provided for locking out the seat brake, such means including a means for releasably locking the vertical rod 60 in a downward, brake disengaged position. This means for locking out the seat brake functions to permit the vehicle 10 to be pushed or otherwise moved when the operator is not sitting on the seat 24. The means for locking includes a stop member 96 fixed to the vertically movable rod 60 and supported by the vertical rod 60 for movement therewith between the upper position and the lower position. The means for locking also includes a seat brake lockout member 98 supported for pivotal movement between a first position illustrated in solid lines in FIG. 2 and wherein the lockout member 98 engages the stop member 96 to thereby restrain the vertical rod 60 against upward movement and a second position shown in phantom in FIG. 2 and wherein the seat brake lockout member 98 is moved away from the stop member 98 and the vertical rod 60 is freely vertically movable. While the stop member 96 may have various constructions, in the illustrated arrangement it includes a washer surrounding the vertical rod 60 and held in place by a pair of nuts 100 positioned on opposite sides of the washer and threaded onto the upper threaded end of the vertical rod 60.

While the lockout member 98 could be constructed in various ways, in the illustrated arrangement it comprises an inverted L-shaped bracket having a base portion 102 and an integral leg or generally vertical leg portion 104 extending downwardly from one end of the base portion 102. The free end 106 of the base portion 102 is pivotally supported against the lower surface 108 of the horizontal portion of the bracket member 68 such that the lockout member 98 is supported for movement between the locking position shown in full lines in FIG. 2 and a release position shown in broken lines in FIG. 2. The leg portion 104 is at a right angle with the base portion 102 and extends downwardly from the base portion 102 such that, when the locking member is moved to the locking position, the lower end of the leg portion 104 is engageable with the upper surface of the stop member 96 to preclude the stop member 96 from upward vertical movement. When the lockout member 98 is in the locking position wherein the stop member 96 engages the lower end of the leg portion 104 of the locking member 98, the upward force of the spring 82 on the rod 60 causes the stop member 96 to apply an upward force on the locking member 98 thereby releasably wedging it in place in the locking position.

In the illustrated arrangement, the means for supporting the lockout member 98 for movement between the locking position and the release position includes a pin 112 extending through an opening in the horizontal portion 68 of the bracket member and through a similar opening in the base portion 102 of the lockout member 98. The upper end of the pin 112 includes a head resting on the horizontal portion 68 of the bracket member 66. A compression spring 114 is compressed between a lower portion of the pin 112 and the lower surface of the base portion 102 of the lockout member 98. The compression spring 114 tends to bias the base portion 102 of the lockout member 98 upwardly against the lower surface 108 of the horizontal portion 68 of the bracket member 66. Accordingly, when the vertical rod 60 is pushed downwardly and the stop member 96 moves away from the lower end of the leg portion 104 of the lockout member 98, the compression spring 114 will cause the lockout member 98 to pivot away from the solid line locking position shown in FIG. 2 to the release position shown in phantom in FIG. 2 and wherein the leg member 104 is supported generally vertically and wherein the vertical rod 60 is freely movable.

Various features of the invention are set forth in the following claims.

I claim:

1. A seat brake for use in a vehicle having a frame, a seat, at least a portion of said seat being movable with respect to said frame between a lower position when weight is placed on the seat and an upper position when weight is removed from the seat, and a brake selectively engageable to brake said vehicle, said seat brake comprising means for causing said brake to be engaged when said portion of said seat moves to said upper position and for causing said brake to be disengaged when said portion of said seat moves to said lower position, said means for causing said brake to be engaged including a vertically shiftable member having an upper end engageable with said portion of said seat and a lower end, and a fixed support member for supporting said vertically shiftable member for vertical movement, and means for connecting said lower end of said vertically shiftable member to said brake and for causing said brake to be engaged when said vertically shiftable member moves upwardly and for causing disengagement of said brake when said vertically shiftable member moves downwardly, and means for selectively locking said brake is disengagement including a stop member fixed to said vertically shiftable member below said fixed support member and movable with said vertically shiftable member toward and away from said fixed support member, a locking member including an upper end and a lower end, and means for supporting said locking member for pivotal movement between a first position wherein said locking member is positioned between said stop member and said fixed support member and wherein said lower end of said locking member engages said stop member and said upper end of said locking member engages said fixed support member to prevent upward movement of said stop member and said vertical member and a second position wherein said stop member and said vertically shiftable member are freely movable with respect to said locking member and said fixed support member.

2. A seat brake as set forth in claim 1 wherein said means for connecting said lower end of said vertically shiftable member to said brake includes a lever arm having one end supported for pivotal movement about an axis, said one end being connected to said brake and an opposite end connected to said vertically movable member for movement with said vertically movable member.

3. A seat brake as set forth in claim 1 wherein said vertically shiftable member comprises a vertically extending rod, said rod having an upper end engaging said portion of said seat, and said rod having a lower end and further including a spring means connected to said rod and biasing said rod upwardly against said portion of said seat.

4. A seat brake as set forth in claim 1 wherein said fixed support member comprises a bracket fixed to said frame and supporting said vertically shiftable member, and wherein said upper end of said locking member is supported by said bracket.

5. A seat brake as set forth in claim 1 wherein said means for selectively locking includes means for resiliently biasing said locking member toward said second position.

6. A vehicle comprising: a frame, wheels for supporting the frame for movement along the ground, a seat for supporting an operator, at least a portion of said seat being movable between an upper position and a lower position when weight is placed on the seat, an engine, means for drivingly connecting the engine to at least one of said wheels, said means for drivingly connecting including a drive shaft, and means for braking said drive shaft when said seat is in said upper position, said means for braking including a vertical member supported for vertical movement with said seat portion between an upper position when said seat portion is in said upper position and a lower position when said seat portion is in said lower position, a brake disc fixed to said drive shaft for rotation with said drive shaft, means for selectively frictionally engaging said brake disc to restrain said brake disc against rotation, said means for selectively frictionally engaging said brake disc including a friction member movable toward and away from said brake disc, and means connected to said vertical member and forcing said friction member into frictional engagement with said brake disc when said vertical member is in said upper position and for releasing said friction member from frictional engagement with said brake disc when said vertical member moves to said lower position, a fixed support member for supporting said vertically shiftable member for vertical movement, and means for releaseably locking said vertical member in said lower position, said means for releaseably locking including a stop member fixed to said vertical member below said fixed support member and movable with said vertically shiftable member toward and away from said fixed support member and a locking member supported by said frame for pivotable movement between a locking position wherein said pivotable member is positioned between said stop member and said fixed support member and engages said stop member to prevent upward movement of said stop member and said vertical member and a release position wherein said stop member and said vertical member are freely movable with respect to said locking member and said fixed support member.

7. A vehicle as set forth in claim 6 wherein said vertical member comprises a rod having an upper end engaging said portion of said seat and wherein said stop member comprises a flange surrounding said rod and fixed to said rod for movement with said rod.

* * * * *